(12) United States Patent
Horneman (10) Patent No.: US 7,277,410 B2
(45) Date of Patent: Oct. 2, 2007

(54) METHOD FOR ALLOCATING INFORMATION TRANSFER CAPACITY IN MOBILE COMMUNICATION SYSTEM, AND MOBILE COMMUNICATION SYSTEM

(75) Inventor: Kari Horneman, Oulu (FI)

(73) Assignee: Nokia Corporation, Espoo (FI)

( * ) Notice: Subject to any disclaimer, the term of this patent is extended or adjusted under 35 U.S.C. 154(b) by 816 days.

(21) Appl. No.: 10/611,680

(22) Filed: Jul. 2, 2003

(65) Prior Publication Data

US 2005/0002353 A1 Jan. 6, 2005

(30) Foreign Application Priority Data

Jul. 3, 2002 (WO) .................. PCT/FI02/00603

(51) Int. Cl.
*H04Q 7/00* (2006.01)
*H04M 11/00* (2006.01)
*H04M 1/00* (2006.01)

(52) U.S. Cl. .................. 370/329; 455/405; 455/562.1

(58) Field of Classification Search ............... 370/329, 370/335; 455/435.1, 452.2, 518, 562.1, 405
See application file for complete search history.

(56) References Cited

U.S. PATENT DOCUMENTS 6,865,169 B1 * 3/2005 Quayle et al. ............ 370/335

| 6,889,050 | B1 * | 5/2005 | Willars et al. | ........... 455/452.2 |
|---|---|---|---|---|
| 6,915,131 | B2 * | 7/2005 | Hamada | ................ 455/435.1 |
| 6,983,162 | B2 * | 1/2006 | Garani et al. | ............... 455/518 |
| 7,072,661 | B2 * | 7/2006 | Vitebsky | ................ 455/452.1 |
| 2002/0136174 | A1 * | 9/2002 | Gleeson | ................ 370/329 |

FOREIGN PATENT DOCUMENTS

| EP | 1217852 A1 | 6/2002 |
|---|---|---|
| WO | 01/63851 A1 | 8/2001 |
| WO | 01/74096 | 10/2001 |
| WO | 02/17107 | 2/2002 |

* cited by examiner

*Primary Examiner*—Joseph Feild
*Assistant Examiner*—Kiet Doan
(74) *Attorney, Agent, or Firm*—Squire, Sanders & Dempsey L.L.P.

(57) ABSTRACT

A method for allocating information transfer capacity in a mobile communication system, and a mobile communication system are provided. In the method according to the invention, the information transfer capacity is allocated to the user by forming a high capacity service site inside a cell of a base station by using a remote unit of a base station. The invention enables allocation of capacity to a specific mobile station with a low cost of multi-user interference generated to other receivers in the cell.

44 Claims, 4 Drawing Sheets

METHOD FOR ALLOCATING INFORMATION TRANSFER CAPACITY IN MOBILE COMMUNICATION SYSTEM, AND MOBILE COMMUNICATION SYSTEM

FIELD

The invention relates to a method for allocating information transfer capacity in a mobile communication system, and a mobile communication system.

BACKGROUND

As the number of mobile equipments increases and the need for transferring great amounts of information, such as video and audio signals, over wireless communications systems has increased, the capacity requirements imposed on the mobile communication systems have been substantially restricted. In communication systems based on CDMA-technology and its derivatives, the capacity is mainly limited by multi-user interference occurring between the transceivers using the same carrier frequency, and by fading of the communication channels due to multi-path propagation of a radio signal.

According to prior art solutions, the capacity of a mobile communication system is increased by using sectorization of a cell of a base station. In sectorization, the cell of a base station is physically divided into several sub-cells, which are possibly further separated by sector-specific coding. If the radiation pattern of each sector were ideal, the capacity of the cell would increase linearly as a function of the number of sectors.

The prior art solutions provide very limited tools for increasing the capacity of a mobile communication system. The limitations arise from the fact that the sectors overlap giving rise to multi-user interference, and from the fact that the sectorization cannot fully resolve the problems of the fading channels.

BRIEF DESCIPTION

An object of the invention is to provide an improved method and an improved mobile communication system for providing increased capacity in a mobile communication system.

An aspect of the invention is a method for allocating information transfer capacity in a mobile communication system, the mobile communication system comprising a base station and a mobile station, the method comprising: forming a connection between the base station and the mobile station, requesting for allocation of information transfer capacity to the mobile station; connecting the mobile station to a service site formed by a remote station of the base station, the service site being located inside the cell formed by the base station, the service site using the same radio interface as the cell, the service site providing the mobile station with higher information transfer capacity than the cell, the remote station being controlled by the base station, and the traffic of the remote station being routed via the base station; and transferring information by using the service site.

An aspect of the invention is a mobile communication system comprising: a base station for providing a mobile station with radio transmission and reception; a mobile station connected to the base station for providing a user of the mobile station with access to the mobile communication system; a base station control unit for controlling the radio connection between the base station and the mobile station; the base station comprises a main station for forming a cell; the base station comprises a remote station connected to the main station for providing the mobile station with radio transmission and reception; the remote station is configured to use the same radio interface as the main station; and the remote station is configured to form a service site inside the cell, the service site providing the mobile station with higher information transfer capacity than the cell.

Preferred embodiments of the invention are disclosed in the dependent claims.

The invention is based on the idea that the mobile communication system can allocate information transfer capacity to a specific user by forming a service site inside the base station cell, which service site is entered by the user whenever increased capacity is needed.

The method and the system of the invention provide several advantages. For example, they enable high data transfer rates for a user using the service site with low multi-user interference effects.

LIST OF DRAWINGS

The invention is now described in closer detail in connection with the preferred embodiments and with reference to the accompanying drawings, in which.

DESCRIPTION OF EMBODIMENTS

Since the invention is suitable for use in radio systems between different generations, embodiments will be described in a radio system illustrated in FIG. 1, wherein network elements of different generations coexist. In the description, a 2G radio system is represented e.g. by a GSM (Global System for Mobile Communications), which is based on the TDMA (Time Division Multiple Access) technology. A 2.5G is represented e.g. by a GPRS (General Packet Radio System). A 3G radio system is represented e.g. by a system which is based on the GSM system and which utilizes WCDMA (Wideband Code Division Multiple Access) technology, and systems known at least by the names IMT-2000 (International Mobile Telecommunications 2000) and UMTS (Universal Mobile Telecommunications System). The embodiments are not, however, restricted to these systems described as examples but a person skilled in the art can also apply the teachings to other radio systems comprising corresponding characteristics.

Figure 1:
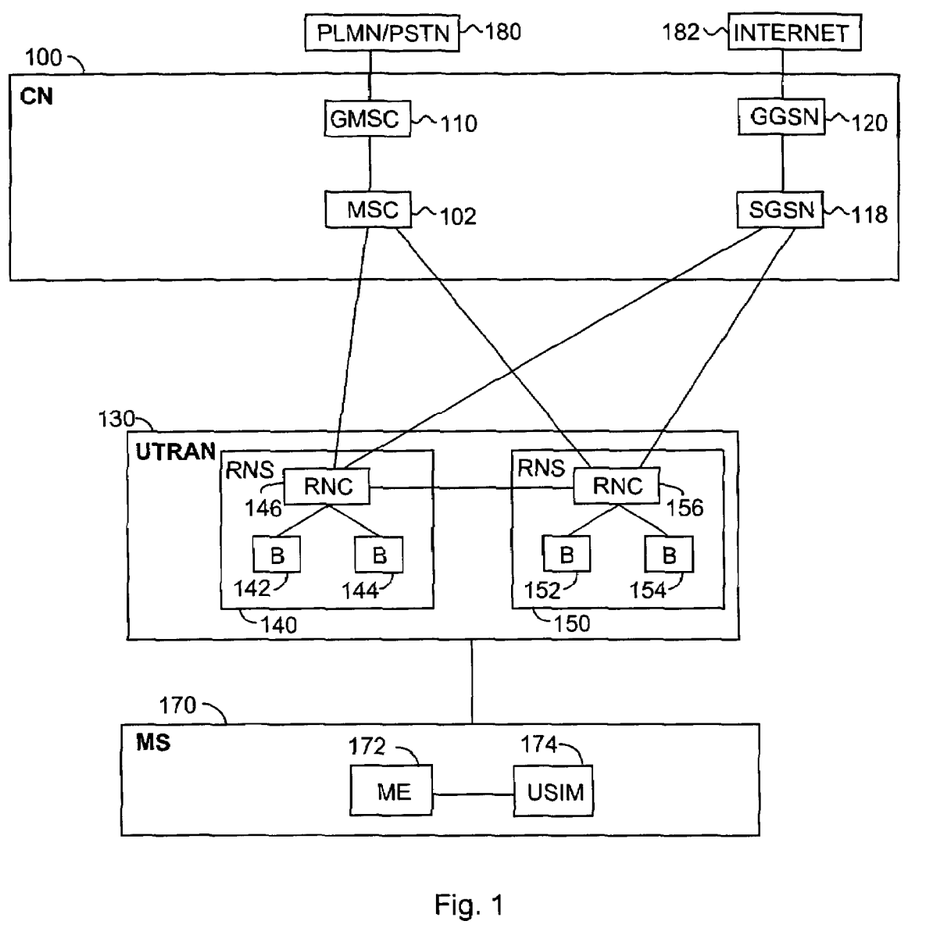
FIG. 1 shows an example of a structure of a radio system.

FIG. 1 is a simplified block diagram showing, at a network element level, the most important parts of a radio system. The structure and functions of the network elements are only described when relevant to the present solution.

The main parts of a radio system are a core network (CN) 100, a radio access network 130 and a mobile station (MS) 170. For simplicity, a radio access network called UTRAN (UMTS Terrestrial Radio Access Network) 130 is taken as an example. UTRAN belongs to the third generation and is implemented by wideband code division multiple access technology. The network elements of the GSM system not shown in FIG. 1 can be implemented as a separate system from UTRAN known as GERAN (GSM/EDGE Radio Access network), or included in the UTRAN infrastructure. However, the division between the different radio systems is not relevant to the present solution. Furthermore, the solution is not limited to a WCDMA radio interface but applications exist which are implemented with MC-CDMA (Multi-Carrier Code Division Multiple Access) or OFDMA (Orthogonal Frequency Division Multiple Access) technologies.

On a general level, the radio system can also be defined to comprise a mobile station and a network part. The mobile station is also called user equipment, a terminal, a subscriber terminal and a mobile telephone. The network part comprises the fixed infrastructure of the radio system, i.e. the core network, radio access network and the base station system.

The structure of the core network 100 corresponds to a system which incorporates both circuit-switched and packet-switched domains. Both domains can utilize the same radio access network 130.

A mobile services switching center (MSC) 102 is the center point of the circuit-switched side of the core network 100. The mobile services switching center 102 is used to serve the connections of the radio access network 130. The tasks of the mobile services switching center 102 include: switching, paging, user equipment location registration, handover management, collection of subscriber billing information, encryption parameter management, frequency allocation management, and echo cancellation.

Large core networks 100 may have a separate gateway mobile services switching center (GMSC) 110, which is responsible for circuit-switched connections between the core network 100 and external networks 180. The gateway mobile services switching center 110 is located between the mobile services switching center 102 and the external networks 180. An external network 180 can be, for instance, a public land mobile network (PLMN) or a public switched telephone network (PSTN).

A serving GPRS support node (SGSN) 118 is the center point of the packet-switched side of the core network 100. The main task of the serving GPRS support node 118 is to transmit and receive packets together with the mobile station 170 supporting packet-switched transmission by using the radio access network 130 or the base station system. The serving GPRS support node 118 contains subscriber and location information related to the mobile station 170.

A gateway GPRS support node (GGSN) 120 is the packet-switched side counterpart to the gateway mobile services switching center 110 of the circuit-switched side with the exception, however, that the gateway GPRS support node 120 must also be capable of routing traffic from the core network 100 to external networks 182, whereas the gateway mobile services switching center 110 only routes incoming traffic. In our example, external networks 182 are represented by the Internet.

The radio access network 130 comprises radio network subsystems 140, 150. Each radio network subsystem 140, 150 comprises radio network controllers (RNC) 146, 156 and nodes B 142, 144, 152, 154. Node B is a rather abstract concept; the terms 'base transceiver station' or 'base station' are often used instead. In this application Node B is called a base station. The base station provides the mobile station 170 with radio transmission and reception. Solutions exist in which the base station is capable of implementing both the TDMA and WCDMA radio interfaces simultaneously.

The mobile station 170 provides a user of the mobile station with access to the mobile communication system. The mobile station comprises two parts: mobile equipment (ME) 172 and a UMTS subscriber identity module (USIM) 174. The GSM system naturally uses its own identity module. The mobile station 170 comprises at least one transceiver for establishing a radio link to the radio access network 130. The mobile station 170 may comprise at least two different subscriber identity modules. The mobile station 170 further comprises an antenna, a user interface and a battery. Today, different types of mobile station 170 exist, for instance equipment installed in cars, and portable equipment.

The USIM 174 comprises user-related information and information related to information security, such as an encryption algorithm.

Figure 2:
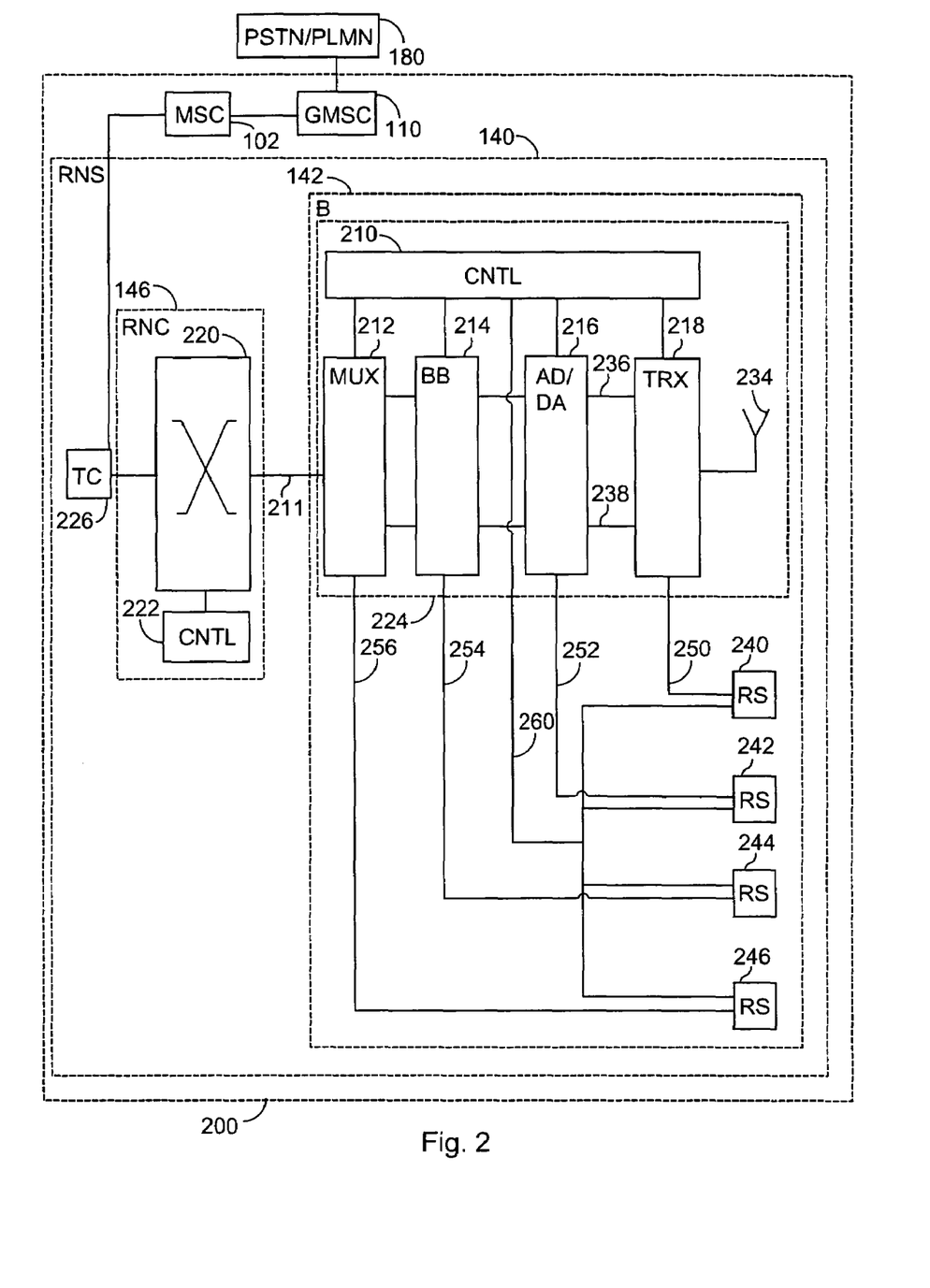
FIG. 2 shows another example of a structure of a radio system.

FIG. 2 shows a mobile services switching center 102, a gateway mobile services switching center 110, which is responsible for the connections of the mobile communication system to the external world, herein to the public telephone network 180, and a network part 200.

The network part 200 comprises a base station 142 controlled by a radio network controller 146, a group switching field 220, and a control unit 222. The group switching field 220 is used for switching speech and data and for connecting signalling circuits. Solutions exist in which the network controller 146 is implemented in the base station 142. The tasks that the network controller 146 performs include, for example: control of logical operations of the base station and maintenance management, traffic management of common channels, handover management, allocation of downlink channelization codes, uplink outer-loop control, load and admission control, and traffic management of shared channels. The control unit 222, in turn, carries out call control, mobility management, collecting statistical data, signalling, and control and management of resources.

The base station 142 and the radio network controller 146 constitute a radio network subsystem 140, which further comprises a transcoder 226, which converts different digital speech encoding formats used between a public telephone network and a radio telephone network into compatible ones, e.g. from the format of the fixed network into another format of the cellular radio network, and vice versa.

The base station 142 comprises a main station 224 and a remote station 240, 242, 244, 246. The remote station 240, 242, 244, 246 provides the mobile station with radio transmission and reception, and uses the same radio interface as the main station 224. Furthermore, the remote station 240, 242, 244, 246 is controlled by the base station 142, and the traffic of the remote station 240, 242, 244, 246 is routed e.g. to the external networks 180, 182 via the base station 142. On a general level, the remote station 240, 242, 244, 246 can include all the basic functionalities included in the base station 142.

The main station 224 comprises a multiplexer unit 212, a baseband unit 214, an analog-digital converter unit 216, a transceiver unit 218 and a control unit 210.

The multiplexer unit 212 is used for arranging the traffic and control channels used by the transceiver unit 218 onto a single transmission connection 211. Furthermore, the multiplexer unit 212 carries out error correction operations and, possibly, bit interleaving and de-interleaving.

The baseband unit 214 comprises e.g. a digital signal processor, ASICs (Application-Specific Integrated Circuits), data busses, data storage media, and software, for example, for coding and decoding of signals.

The analog-digital converter unit 216 comprises A/D (analog-to-digital) and D/A (digital-to-analog) converters for digitizing analog antenna signals and for converting digital antenna signals to analog form.

The transceiver unit 218 comprises e.g. frequency modulators for modulating the baseband signals to the radio frequency and vice versa, and amplifiers for amplifying antenna signals. Furthermore, the transceiver unit 218 comprises e.g. duplex filters for separating the received and transmitted antenna signals from each other.

The transceiver unit 218 is connected to an antenna unit 234. The antenna unit 234 is used for implementing a radio connection to a mobile station 170. In an embodiment of the present solution, the antenna unit 234 comprises an antenna array for beam forming. The antenna unit 234 can also comprise leaky cables for forming an elongated radiation pattern.

The control unit 210 controls the operation of the multiplexer unit 212, baseband unit 214, analog-to-digital converter unit 216, the transceiver unit 218, and the remote station 240, 242, 244, 246.

The combination of the multiplexer unit 212, the baseband unit 214, the analog-digital converter unit 216, and the transceiver unit 218 constitute at least two collector-distributor routes 236, 238 for processing transmitted and received signals. Each collector-distributor route 236, 238 is capable of independent antenna signal processing, which includes e.g. weighting of the antenna signals and user-specific signals. At least one of the collector-distributor routes 236, 238 is dedicated to processing the signals transmitted and received by the antenna unit 234. At least one of the collector-distributor routes 236, 238, respectively, deals with the signals transmitted and received by the remote station 240, 242, 244, 246. However, in the latter case, the details in the set-up of the collector-distributor route 236, 238 depend on the details of the specific embodiment.

Figure 3:
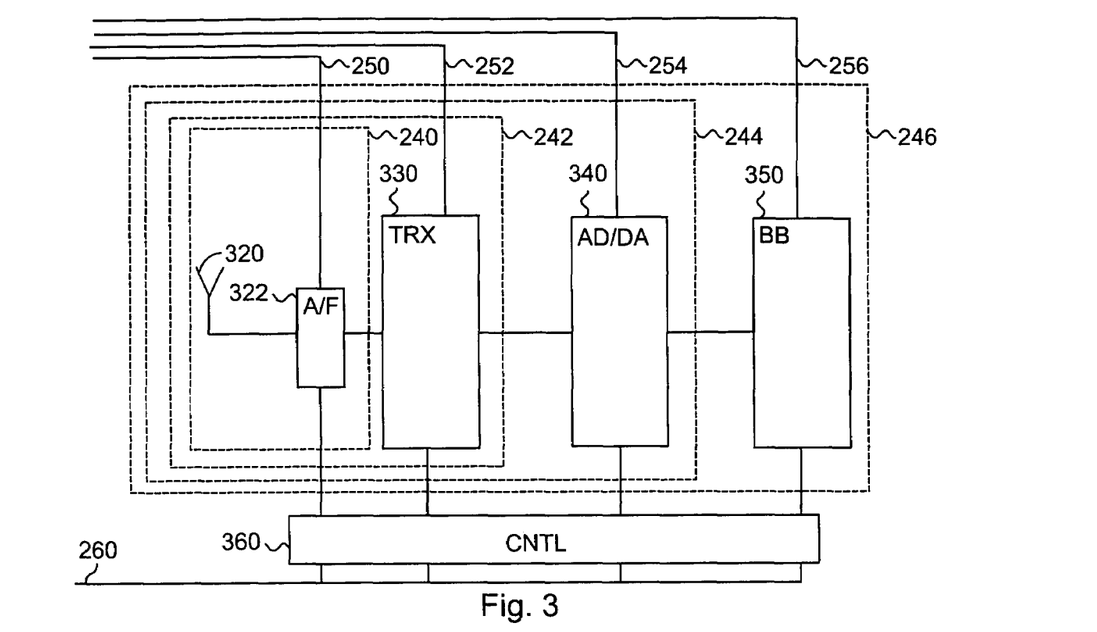
FIG. 3 shows an example of a structure of a remote station.

Referring to FIGS. 2 and 3 examine embodiments of transferring traffic between the remote station 240, 242, 244, 246 and the main station 224, and the corresponding coupling arrangements between the remote station 240, 242, 244, 246 and the main station 224. In an embodiment, the remote station 240 is connected to the transceiver unit 218 of the base station 142. The remote station 240, correspondingly, comprises at least an antenna unit 320. The antenna unit 320 comprises at least one antenna element for providing the mobile station 170 with radio transmission and reception. The antenna unit 320 can also comprise an adaptive antenna array, thus enabling beam forming and user-specific antenna beams that can follow the motion of the mobile station 170. In this case, the radio frequency analog signals are transmitted between the main station 224 and the remote station 240. The signals can be further subjected to amplification and/or filtering in an amplifier-filter unit 322, which comprises power amplifiers and/or duplex filters, respectively. The physical connection 250 between the transceiver unit 218 of the main station 224 and the amplifier-filter unit 322 of the remote station 240 can be implemented, for example, with coaxial cables suitable for conducting radio frequency signals.

In an embodiment, the remote station 242 is connected to the analog-digital converter unit 216 of the main station 224. The remote station 242, correspondingly, comprises the antenna unit 320 and the amplifier-filter unit 322 described above. Furthermore, the remote station 242 comprises a transceiver unit 330 including similar elements and performing similar tasks to those of the transceiver unit 218 of the main station 224. However, the maximum output power requirement is substantially lower than that of the main station 224. In this embodiment, analog baseband signals are transmitted between the main station 224 and the remote station 242. The modulation of the base band signals to the radio frequency is now carried out in the transceiver unit 330 of the remote station 242. The connection 252 between the transceiver unit 330 of the remote station 242 and the analog-digital converter unit 216 of the main station 224 can be implemented with a galvanic conductor arrangement, such as a coaxial cabling, an optical data transmission, or with a fixed radio link. The means for optical data transmission and radio link transmission are not shown, but their structure and implementation are well known to a person skilled in the art.

In an embodiment, the remote station 244 is connected to the base band unit 214 of the main station. The remote station 244, correspondingly, comprises the antenna unit 320, the amplifier-filter unit 322, and the transceiver unit 330 described above. Furthermore, the remote station 244 comprises an analog-digital converter unit 340 including similar elements and performing similar tasks as the analog-digital converter unit 216 of the main station 224. The connection 254 between the analog-digital converter unit 340 of the remote station 244 and the base band unit 214 of the main station 224 can be implemented in the manner described above.

In an embodiment, the remote station 246 is connected to the multiplexer unit 212 of the main station 224. The remote station 246, correspondingly, comprises the antenna unit 320, the amplifier-filter unit 322, the transceiver unit 330, and the analog-digital converter unit 340 described above. Furthermore, the remote station 246 comprises a base band unit 350 including similar elements and performing similar tasks to those of the base band unit 212 of the main station 224. The connection 256 between the analog-digital converter unit 340 of the remote station 244 and the base band unit 214 of the main station 224 can be implemented e.g. with a galvanic conductor arrangement well known to a person skilled in the art.

The control unit 210 controls the relevant elements 322, 330, 340 350 of the remote station 240, 242, 244, 246. For example, the control unit 210 controls the transmit power of the remote station 242, 244, 246 by adjusting the transceiver unit 330 and possibly the base band unit 350 accordingly. Furthermore, the control unit 210 deals with handover management, which handover occurs between the cell of the main station 224 and the coverage area of the remote station 240, 242, 244, 246. In a WCDMA system, such handover is called softer handover. The control unit 210 is connected to the remote station 240, 242, 244, 246 by the conductor means 260, such as a coaxial cable.

In an embodiment, the remote station 240, 242, 244, 246 comprises a control unit 360 to control local functions of the remote station 240, 242, 244, 246. Such local functions include e.g. power control and associated measurements, load and admission control, and tasks associated with ARQ (Automatic Repeat Request). The tasks controlled by the control unit 360 can also be sub-functions of the radio network controller 146.

Figure 4:
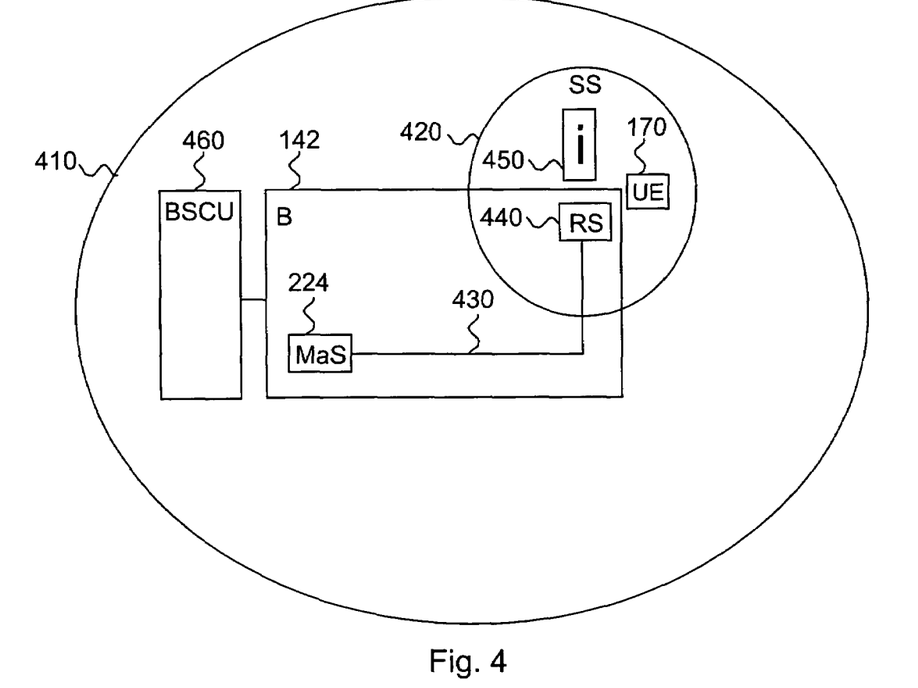
FIG. 4 shows an example of the cell and a service site according to the invention.

Referring to FIG. 4 consider the basics of the operation of the radio system presented in the present solution. FIG. 4 shows the base station 142, the base station control unit 460, and the mobile station 170. The base station control unit 460 deals e.g. with load and admission control, and control of scrambling and channel coding. The base station control unit 460 can be implemented as a part of the radio network controller 146.

The base station 142 comprises a main station 224 for forming a cell 410. The main station may be connected to the remote station 440 by a connecting means 430, such as a galvanic or optical link, for example.

The coverage of the cell 410 can vary from dozens of kilometers of the macro cell range to dozens of meters of the pico cell range. The cell 410 can be, for example, a sectorized cell, and it can include user-specific radiation patterns. The remote station 240, 242, 244, 246, indicated with a single reference number 440 in FIG. 4, is configured to form a service site 420 inside the cell 410, the service site 420 providing the mobile station 170 with higher capacity than the cell 410. The service site 420 is a zone wherein the radio transmission and reception of the remote station 440 are available to the mobile station 170. The capacity of the service site 420 is based on a short distance, typically of the order of meters, between the remote station 440 and the mobile station thus enabling low transmit power of the order of several nW of both the mobile station 170 and the remote station 440. The capacity allocated by using the service site 440 to a single mobile station 170 can be of the order of the capacity of the entire cell 410 or a sector of the cell 410, and it is primarily limited by the multi-user interference arising from other radio sources in the cell. The shape and the size of the service site 420 depend on the specific application of the service site 420. On a general level, the dimensions of the service site 420 are in accordance with the free path of the mobile station 170 connected to the remote station 440. The free path of the mobile station 170 can be defined as a space taken by the user during the connection to the remote station 420. If the service site 420 serves a user who is virtually immobile, the operating range of the service site 420 can be as short as half a meter. The corresponding transmit power can vary from 1 nW to 10 nW. In an application where the service site 420 serves a moving user, such as a mobile station in a vehicle, a prolate shape of the service site 420 can be applied and the operating range can be as long as 50 meters, corresponding to a transmit power of the order of 1 µW. The desired shape of the radiation pattern can be obtained with antenna beam techniques or leaky cables used as an antenna. The characteristics described above give rise to the term "femto cell" used for the service site 420.

In an embodiment, the operating range of the service site 420 is confined to a line-of-sight range from the remote station 440, thus enabling good quality of the communication channel. The good quality of the communication channel gives rise to reduced signalling, reduced retransmitting, and efficiency in channel coding.

In an embodiment, the operating range of the service site 420 is based on a channel estimate produced by the base station 142 or by the mobile station 170. The channel estimate can be e.g. SINR (Signal-to-Interference+Noise Ratio), which characterizes the quality of the radio channel and from which the information transfer capacity can be further derived. If the channel meets the desired capacity requirement and if the multi-user interference generated by the remote station 440 in the cell 410 is acceptable, the connection between the mobile station 170 and the service site 440 can be established.

In an embodiment, the service site 420 uses a different physical radio channel from that used in the cell 410. The separation between the physical radio channels can be achieved by using different multiple access methods. In the CDMA-based methods including WCDMA, the radio channels can be implemented with different codes used by the service site 420 and the cell 410. The physical channels can also be identified by different carrier frequencies, which is characteristic of FDMA (Frequency Division Multiple accees) based methods. The channels can also be separated by using different time-slots, which is characteristic, for instance, of TDMA (Time Division Multiple Access) methods, which further apply different frequency bands to separate signals between different sectors. Furthermore, multiplexing can be based on a combination of the aforementioned methods. However, the multiplexing scheme irrelevant to the present solution.

The operation and usage of the service site 440 will be discussed in the following. For simplicity, the examples shown are limited to an operation with a single mobile station 170, but the examples also apply to cases wherein two or more mobile stations 170 communicate with the service site 420 simultaneously. The basic idea of the operation of the service site 420 is illustrated in a flow diagram shown in FIG. 5. In the start block 500, the mobile station 170 may be situated with in the coverage of the cell 410 and connected 510 to the main station 224 of the base station 142. In the meantime, the mobile station 170 can transfer information with the main station 224, or be in an idle mode. The procedure continues with a request 520 for allocation of information transfer capacity to the mobile station 170. In an embodiment, the request is directed to the base station control unit 460, which deals with the radio resource control of the cell 410 and the service site 420. In an embodiment, the mobile station 170 detects, before requesting for allocation of information transfer capacity to the mobile station 170, a need for allocating information transfer capacity to the mobile station 170. The detection can arise, for example, from data reception or transmission. The request for allocating capacity can also be generated in the base station control unit 460 if there is a need to decrease the load of the cell 410. In such a case, the base station control unit 460 suggests a suitable mobile station 170 to enter the service site 420, and the radio resources of the mobile station 170 will be released for other users in the cell.

Figure 5:
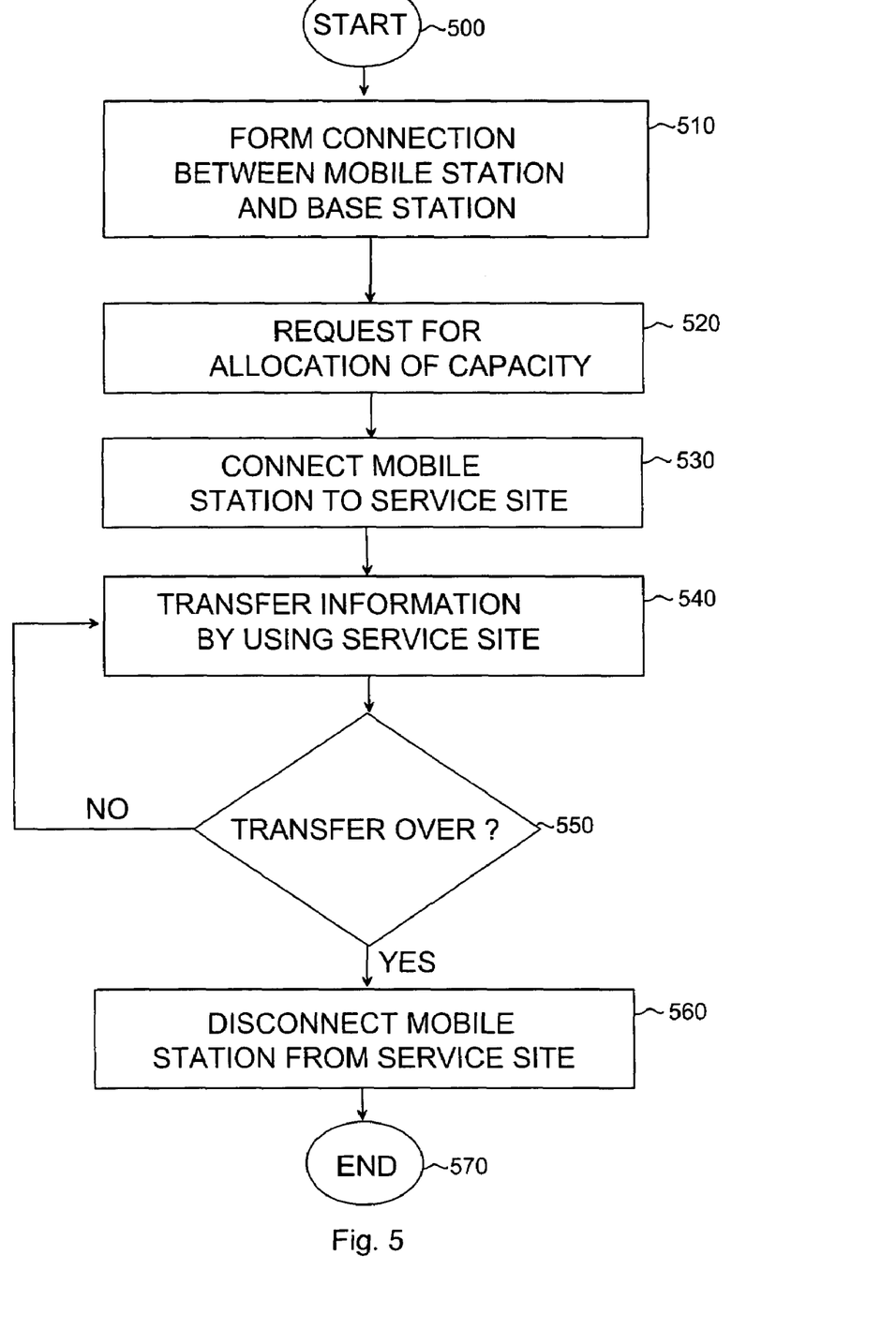
FIG. 5 shows a flow diagram illustrating the operation of the service site according to the invention.

After requesting 520 allocation of capacity to the mobile station 170, the mobile station 170 is connected 530 to the service site by forming a radio connection with the remote station 440. The connection between the remote station 440 and the mobile station can be established with a softer-hand over procedure controlled by the control unit 210 of the base station 142. In an embodiment of the hand-over procedure, in the transition phase, the mobile station 170 is connected both to the main station 224 and to the remote station 440 using the same scrambling code. The signals from the main station 224 and the remote station can be distinguished by generating an artificial delay in the signal of the remote station followed by a change in the scrambling code used by the remote station 440. The command to change the scrambling code can be generated in the base station control unit 460, and delivered to the mobile station by the control channels, such as the random access channel (RACH) according to the 3G specification. After the mobile station 170 has been connected to the service site 420, information is transferred 540 between the mobile station 170 and the service site 420. The information is e.g. speech or audiovisual data. If the transfer is over 550, the mobile station 170 may be disconnected from the service site 420. The method ends in 570.

In an embodiment, the transmit power of the mobile station 170 is decreased to a predetermined level, after the mobile station 170 has been connected to the service site 420. In an embodiment, the predetermined power level is lower than a normal minimum transmit power defined in the radio system. For example in the 3G specifications, the minimum transmit power of the mobile station is −50 dBm corresponding to 10 nW.

The low transmit power reduces the multi-user interference in the cell 410, and it can be used when short distance exists between the mobile station 170 and the remote station 440. The power control command can be given by the base station control unit 460, or it can be generated by the mobile station 170 itself. In an embodiment, the transmit power of the remote station 440 is controlled according to the information transfer capacity requirement of the mobile station 170. For example, if the signals from the cell 410 give rise to an increase in the multi-user interference, the power of the remote station 440 can be increased.

In an embodiment, the mobile station 170 is connected to the service site 420 based on an intentional act of the user of the mobile station 170 to use the service site 420. The intentional act comprises e.g. entering the service site 420 or switching on a specific application in the mobile station 170, the application requiring high capacity. Consequently, it is preferred, that the location information on the service site 420 is known to the user a priori. The location information can be delivered to the user with visual signs 450, which can be used to show the exact location of the service site 420 and which can further guide the user to the proximity of the service site 420. A visual sign 450 is an identifier, such as a signboard by which the user can identify the service site 420.

In an embodiment, the mobile station 170 is connected to the service site 420 whenever the mobile station 170 is located within the operating range of the service site 420 and whenever there is a request for a capacity allocation to the mobile station 170. Also, in an embodiment, the mobile station 170 is disconnected 560 from the service site 420 whenever the mobile station 170 is located outside the operation range of the service site 420. The mobile station 170 can also be disconnected 560 from the service site 420 whenever the data transfer between the remote station 440 and the mobile station 170 is completed. After the mobile station 170 has been disconnected 560 from the service site 420, the mobile station 170 can be reconnected to the cell 410 of the base station 142 or it can be switched off.

In an embodiment, the location of the mobile station 170 is determined based, for example, on a direction-of-arrival (DoA) estimate of the mobile station. The DoA estimate can be generated in the base station control unit 460 based on the signals received from the mobile station 170 as is known to a person skilled in the art. As the remote station 440 is located in a fixed position, the location of the service site 420 is known a priori to the base station 142, and it is a matter of trivial calculation to obtain the relative position of the mobile station 170 and the service site 420. The positioning of the mobile station 170 can also be based on measurements carried out by at least two base stations on the direction of the mobile station 170.

The location determination of the mobile station 170 can also be based on positioning systems available to public, such as GPS (Global Positioning System). In this case, the mobile equipment itself has elements for generating the location information or it is attached to specific equipment for that purpose.

In an embodiment, the mobile station 170 is provided with accessibility information on the service site 440. The accessibility information comprises e.g. the data transfer capacity available in the service site 420, and the information whether or not the specific service site 440 is reserved for another user. The accessibility information can be produced and processed in the base station control unit 460, and transferred to the mobile station 170 by means of the control channels of the radio system.

In an embodiment, the mobile station 170 is provided with guidance information to the service site 420. The guidance information comprises the location of the nearby service sites 420 relative to the position of the mobile station 170, and possibly instructions for finding a service site 420. The guidance information can be produced and processed in the base station control unit 460, but it can be downloaded to and stored in the mobile station as well.

In an embodiment, the mobile station 170 is provided with means for indicating the location information on the service site 420. The mobile station can display a map of the relevant area, which includes an indication of the direction of the service site 420 and other relevant information necessary for finding it.

A single base station 142 can comprise several remote stations 440, each of which forms a service site 420. It is believed that especially in the urban areas, the remote stations 440 can form a web-like structure, the distance between the service sites 420 being the order of the range of line-of-sight. Suitable locations of the service sites 420 also include places where the radio interference is a severe problem, such as hospitals.

The remote stations 440 can also be arranged along a highway to provide spot-like high capacity areas, which become available to a user whenever the user enters such an area. This arrangement can be applied if the user is satisfied with burst-like capacity peaks for data transfer. This is possible due to the softer handover procedure applied in the present solution when the connection is interchanged between the cell 410 and the service site 420. Furthermore, the remote station 440 can utilize beam forming in transmission and reception, wherein antenna beams are aimed along a road alignment and possible at the vehicles driving on the highway. Leaky cables installed along the road alignment can also be utilized to form an elongated radiation pattern that covers the vehicles driving on the highway. In such a case, the operating range of the service site 420 is in the order of the width of the highway, which is of the order of dozens of meters.

Although the invention has been described above with reference to the example in accordance with the accompanying drawings, it is obvious that the invention is not restricted thereto but can be modified in many ways within the scope of the inventive idea disclosed in the attached claims.

The invention claimed is:

1. A method comprising:
   forming a connection between a base station and a mobile station of a mobile communication system,
   requesting for allocation of information transfer capacity to the mobile station; and
   connecting the mobile station to a service site formed by a remote station of the base station, the service site being located inside the cell formed by the base station, the service site using the same radio interface as the cell, the service site providing the mobile station with higher information transfer capacity than the cell, the remote station being controlled by the base station, and the traffic of the remote station being routed via the base station; and
   transferring information by using the service site.

2. The method as claimed in claim 1, further comprising detecting in the mobile station, before requesting for allocation of information transfer capacity to the mobile station, a need to allocate information transfer capacity to the mobile station.

3. The method as claimed in claim 1, further comprising connecting the mobile station to the service site by using a different physical radio channel in the service site than that used in the cell.

4. The method as claimed in claim 1, further comprising connecting the mobile station to the service site based on an intentional act of the user of the mobile station to use the service site.

5. The method as claimed in claim 1, further comprising decreasing, the transmit power of the mobile station to a predetermined level after the mobile station has been connected to the service site.

6. The method as claimed in claim 1, further comprising controlling the transmit power of the remote station according to the information transfer capacity requirement of the mobile station after the mobile station has been connected to the service site.

7. The method as claimed in claim 1, further comprising disconnecting the mobile station from the service site after the information has been transferred.

8. The method as claimed in claim 1, further comprising determining the location of the mobile station before the mobile station has been connected to the service site.

9. The method as claimed in claim 1, further comprising connecting the mobile station to the service site whenever the mobile station is located within the operating range of the service site.

10. The method as claimed in claim 1, further comprising disconnecting the mobile station from the service site whenever the mobile station is located outside the operation range of the service site.

11. The method as claimed in claim 1, further comprising providing the mobile station with accessibility information on the service site.

12. The method as claimed in claim 1, further comprising providing the mobile station with guidance information to the service site.

13. The method as claimed in claim 1, further comprising indicating to the user, in the mobile station, the location information on the service site.

14. The method as claimed in claim 1, further comprising informing the user regarding the location of the service site with visual signs.

15. The method as claimed in claim 1, wherein the operating range of the service site depends on the free path of the mobile station.

16. The method as claimed in claim 1, wherein the operating range of the service site is confined to half a meter from the remote station.

17. The method as claimed in claim 1, wherein the operating range of the service site is confined to a line-of-sight range from the remote station.

18. A mobile communication system comprising:
a base station for providing a mobile station with radio transmission and reception;
a mobile station connected to the base station for providing a user of the mobile station with access to the mobile communication system; and
a base station control unit for controlling the radio connection between the base station and the mobile station;
wherein the base station comprises a main station for forming a cell;
wherein the base station comprises a remote station connected to the main station for providing the mobile station with radio transmission and reception;
wherein the remote station is configured to use the same radio interface as the main station; and
wherein the remote station is configured to form a service site inside the cell, the service site providing the mobile station with higher information transfer capacity than the cell.

19. The mobile communication system as claimed in claim 18, wherein the base station control unit is configured to detect a need to allocate information transfer capacity to the mobile station.

20. The mobile communication system as claimed in claim 18, wherein the mobile station is configured to detect a need for allocating information transfer capacity to the mobile station.

21. The mobile communication system as claimed in claim 18, wherein the base station is configured to use a different physical radio channel in the service site than that used in the cell.

22. The mobile communication system as claimed in claim 18, wherein the base station control unit is configured to decrease the transmit power of the mobile station connected to the remote station to a predetermined level.

23. The mobile communication system as claimed in claim 18, wherein the base station control unit is configured to control the transmit power of the remote station according to the information transfer capacity requirement of the mobile station connected to the remote station.

24. The mobile communication system as claimed in claim 18, wherein the base station control unit is configured to determine the location of the mobile station.

25. The mobile communication system as claimed in claim 18, wherein the base station is configured to connect the mobile station to the remote station as the mobile station is located within the operating range of the remote station.

26. The mobile communication system as claimed in claim 18, wherein the base station is configured to the disconnect the mobile station from the remote station according to the information transfer capacity requirement of the mobile station.

27. The mobile communication system as claimed in claim 18, wherein the base station is configured to the disconnect the mobile station from the remote station whenever the mobile station is located outside the operation range of the service site.

28. The mobile communication system as claimed in claim 18, wherein the base station control unit is configured to provide the mobile station with accessibility information of the service site.

29. The mobile communication system as claimed in claim 18, wherein the base station control unit is configured to provide the user of the mobile station with guidance information to the service site.

30. The mobile communication system as claimed in claim 18, wherein the mobile station is configured to indicate the location information of the service site to the user.

31. The mobile communication system as claimed in claim 18, wherein the mobile communication system further comprises a unit configured to inform the user regarding the location of the service site.

32. The mobile communication system as claimed in claim 18, wherein the base station is configured to confine the operating range of the service site according to the free path of the mobile station.

33. The mobile communication system as claimed in claim 18, wherein the base station is configured to confine the operating range of the service site to half a meter from the remote station.

34. A The mobile communication system as claimed in claim 18, wherein the base station is configured to confine the operating range of the service site to a line-of-sight range from the remote station.

35. The mobile communication system as claimed in claim 18, wherein the remote station is configured to confine the transmit power to 10 nW.

36. The mobile communication system as claimed in claim 18, wherein the main station comprises a unit configured to transmit traffic from the remote station and for receiving traffic at the remote station.

37. The mobile communication system as claimed in claim 18, wherein the main station comprises a unit configured to control the remote station.

38. The mobile communication system as claimed in claim 18, wherein the base station comprises a unit configured to transfer signals between the main station and the remote station.

39. The mobile communication system as claimed in claim 18, wherein the remote station comprises a unit configured for radio transmission and reception.

40. The mobile communication system as claimed in claim 18, wherein the remote station comprises a unit configured to perform signal processing.

41. The mobile communication system as claimed in claim 18, wherein the remote station comprises a unit configured to store information.

42. The mobile communication system as claimed in claim 18, wherein the remote station comprises a unit configured to perform beam forming.

43. The mobile communication system as claimed in claim 18, wherein the remote station comprises a control unit for controlling local functions of the remote station.

44. A The mobile communication system as claimed in claim 18, wherein the remote station comprises leaky cables for forming an elongated radiation pattern.

* * * * *